United States Patent
Mills

(10) Patent No.: US 7,383,825 B2
(45) Date of Patent: *Jun. 10, 2008

(54) SMALL ENGINE FUEL TANK WITH INTEGRATED EVAPORATIVE CONTROLS

(75) Inventor: Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/728,701

(22) Filed: Mar. 27, 2007

(65) Prior Publication Data

US 2007/0169758 A1    Jul. 26, 2007

Related U.S. Application Data

(63) Continuation-in-part of application No. 10/874,897, filed on Jun. 23, 2004, now Pat. No. 7,213,583.

(51) Int. Cl.
*F02M 37/20* (2006.01)
*F02M 33/02* (2006.01)

(52) U.S. Cl. .................................. 123/516
(58) Field of Classification Search ............. 123/516, 123/518, 519, 520, 198 D; 137/588, 587, 137/583; 220/86.2, 746; 141/326, 59
See application file for complete search history.

(56) References Cited

U.S. PATENT DOCUMENTS

| | | | |
|---|---|---|---|
| 3,372,679 A | 3/1968 | Aitken | |
| 3,757,753 A | 9/1973 | Hunt | |
| 4,028,075 A | 6/1977 | Roberge | |
| 4,852,761 A * | 8/1989 | Turner et al. ............... | 220/746 |
| 4,919,103 A * | 4/1990 | Ishiguro et al. ............ | 123/514 |
| 5,263,462 A * | 11/1993 | Reddy ........................ | 123/520 |
| 5,687,778 A | 11/1997 | Harris | |
| 5,901,689 A | 5/1999 | Kimura et al. | |
| 6,105,708 A | 8/2000 | Amano et al. | |
| 6,182,693 B1 * | 2/2001 | Stack et al. ............ | 137/565.17 |
| 6,302,137 B1 | 10/2001 | Devall | |
| 6,354,280 B1 * | 3/2002 | Itakura et al. .............. | 123/519 |
| 6,508,263 B1 | 1/2003 | Jahnke et al. | |
| 6,877,488 B2 * | 4/2005 | Washeleski et al. ........ | 123/497 |
| 6,889,729 B2 * | 5/2005 | Bolle et al. ................. | 141/286 |
| 2003/0089405 A1 | 5/2003 | Mills | |
| 2003/0140970 A1 | 7/2003 | Benjey | |
| 2003/0205272 A1 | 11/2003 | Benjey et al. | |
| 2005/0178368 A1 | 8/2005 | Donahue | |
| 2005/0274364 A1 | 12/2005 | Kirk et al. | |

* cited by examiner

*Primary Examiner*—Mahmoud Gimie
(74) *Attorney, Agent, or Firm*—Anna M. Shih

(57) ABSTRACT

A fuel tank assembly for small engines having a vapor storage canister disposed within the tank in the vapor dome with an atmospheric vent line to the canister through the tank wall and a canister vapor outlet line also through the tank wall. A liquid/vapor discriminator is disposed in the vapor dome of the tank with the discriminator outlet connected to the canister inlet. A fuel filler tube extends through the tank wall to a desired depth to prevent vapor from escaping through the filler tube when the fuel level rises to the lower end of the filler tube and alerts the operator by rapid rise of fuel in the filler tube.

12 Claims, 2 Drawing Sheets

SMALL ENGINE FUEL TANK WITH INTEGRATED EVAPORATIVE CONTROLS

This is a continuation-in-part of application U.S. Ser. No. 10/874,897 filed on Jun. 23, 2004, which is now U.S. Pat. No. 7,213,583.

BACKGROUND OF THE INVENTION

The present invention relates to fuel tanks for small engines such as those employed in portable power equipment as, for example, lawn mowers and portable generator sets. Recent regulations for controlling the emission of fuel vapors have required installation of vapor storage devices to prevent escape of fuel vapors through the engine air inlet during periods when the engine is not operating and provide for purging when the engine is running. This recently imposed requirement on small engine manufacturers has created problems in installing the engines in the equipment in which they are to be used inasmuch as the equipment manufacturer commonly purchases the engine and fuel tank for installation as a subassembly during final assembly of the engine operated equipment. Thus, for the aforesaid equipment applications the burden of providing for fuel vapor emission control has been imposed upon the small engine manufacturer and has created problems in the design and installation of the tank and fuel system for the small engines.

In particular, the requirement for a vapor storage device has been found to create problems in mounting the tank and fuel system on a small engine as a prepackaged subassembly; and, has added additional costs in providing for the storage device and the mounting and vapor conduit interconnections between the storage device and the tank. Thus, it has been desired to provide a way or means of controlling fuel vapor emissions from a small engine tank installation in a manner which is self-contained and low in cost.

BRIEF SUMMARY OF THE INVENTION

The present invention provides a small engine fuel tank with integral fuel evaporative controls including a storage canister and a liquid/vapor discriminator disposed within the tank in a manner which provides adequate control of fuel vapor emissions during periods of engine inoperation, permits purging during engine operation and thus simplifies the mounting of the fuel vapor emission devices on the engine.

DETAILED DESCRIPTION OF THE INVENTION

Figure 1:
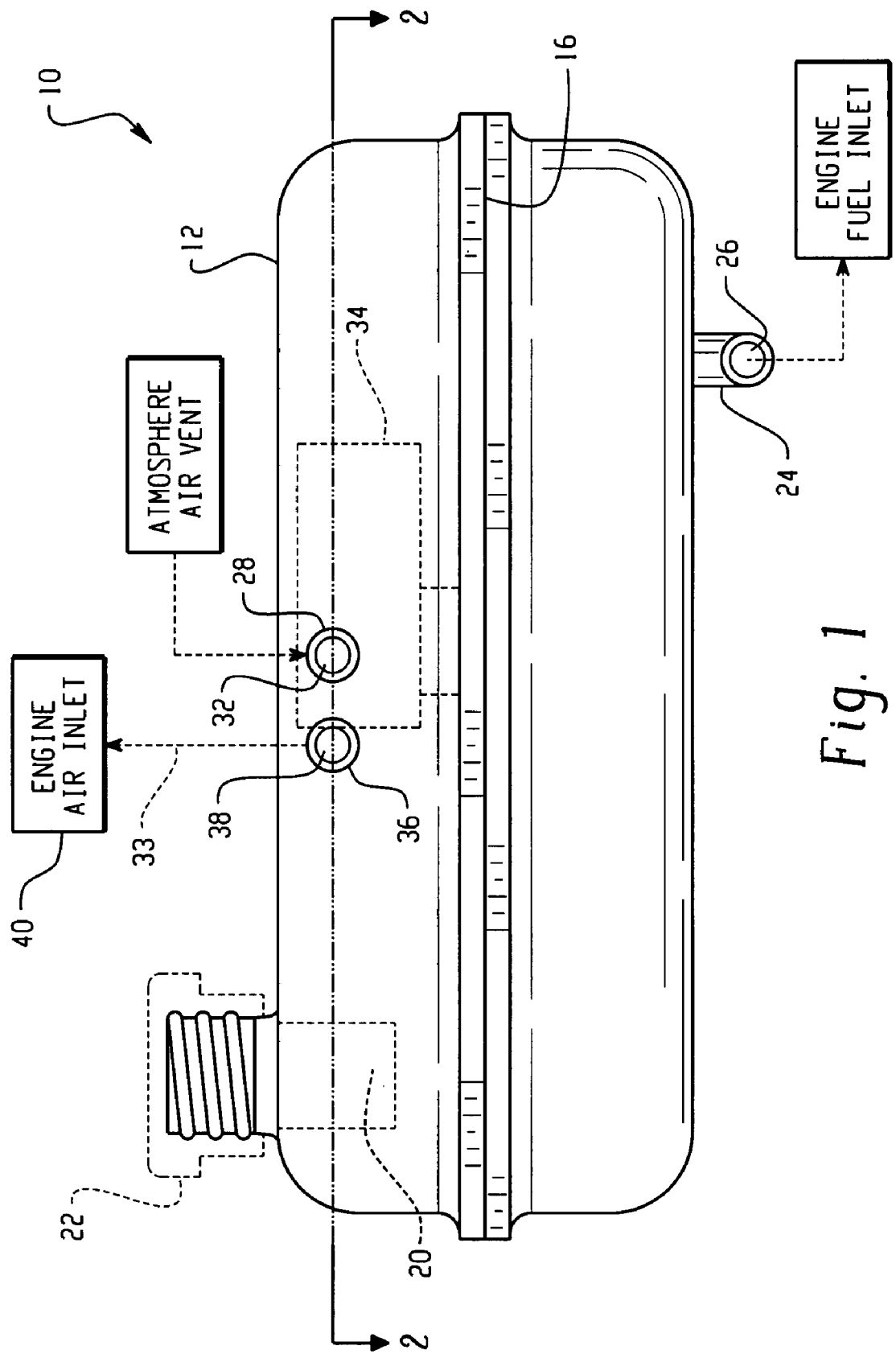
FIG. 1 is a side view of a small engine fuel tank of the type intended for gravity fuel feed to the engine.

Referring to the drawings, the fuel tank assembly of the present invention is indicated generally at 10 and includes a tank 12 having wall structure 14 which may be formed conveniently by weldment about a mid-seam 16 in any manner well known in the art as, for example, by metallic or non-metallic welding as the case may be for the particular material employed for the tank.

The upper wall 18 of the tank has provided therein a filler tube 20 which may be integrally formed with the upper wall 18 and which is adapted for receiving thereover a closure cap 22 indicated in dashed outline in FIG. 1. The tube 20 extends downwardly into the interior of the tank to a desired depth for creating a vapor dome in the region beneath the upper wall 18 when the liquid level in the tank has risen to cover the lower end of tube 20.

Tank 12 has a fuel feed outlet fitting 24 provided through the lower wall on the lower wall thereof with a fuel feed passage 26 formed therein for gravity feed of fuel. It will be understood that fitting 24 is adapted for connection to a fuel line (not shown) for connection to the engine fuel inlet. It will be understood that the feed passage may be disposed at other locations of the tank wall structure, for example, the upper wall 18 in small engines employing a fuel pump.

Tank 12 has a fitting 28 extending from the upper portion of the sidewall 30 and which has a vapor purge passage 32 formed therein. With reference to FIG. 1, the passage 32 is an atmospheric air inlet.

Figure 2:
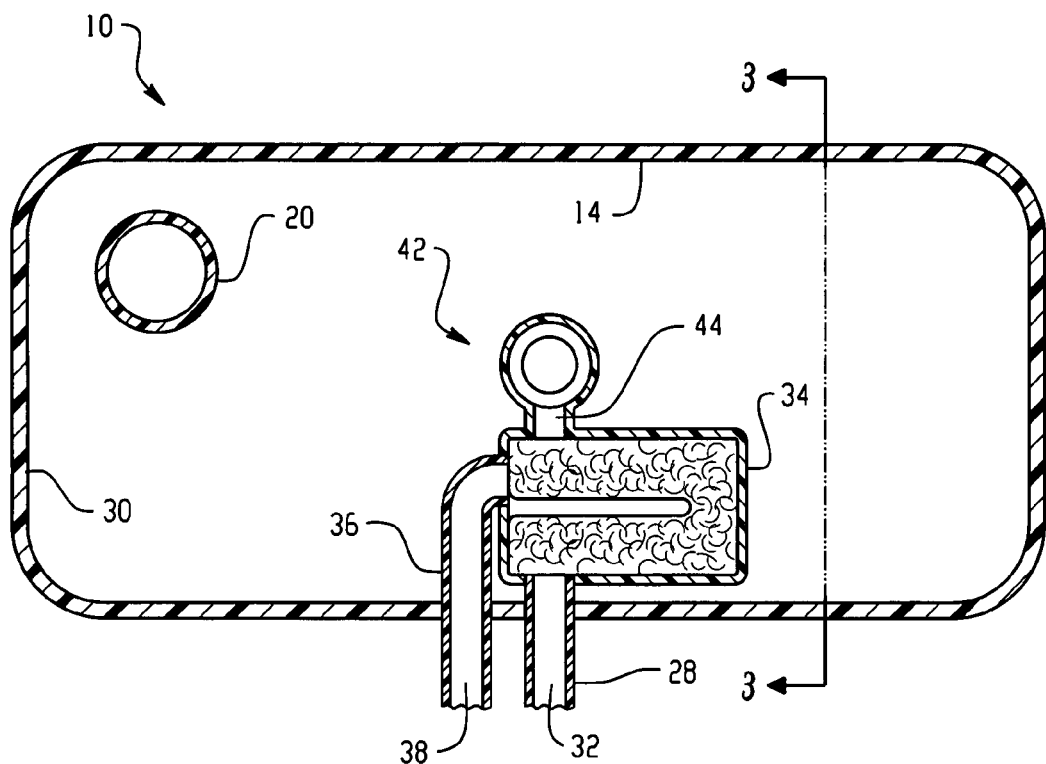
FIG. 2 is a section view taken along section indicating lines 2-2 of FIG. 1; and, FIG. 3 is a section view taken along section indicating lines 3-3 of FIG. 2.
Figure 3:
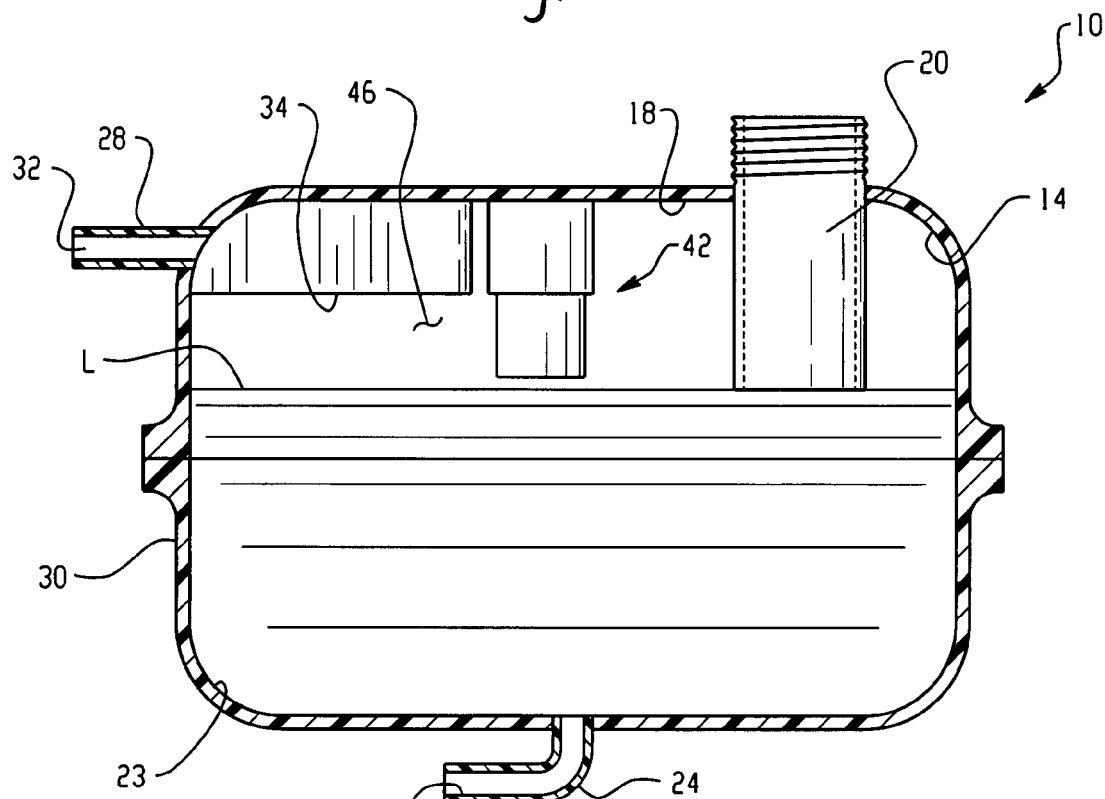

Inlet 32 communicates through the tank wall and to the interior of a vapor storage canister 34 which is disposed within the tank and preferably attached to the inside of the top wall 18 of the tank as shown in FIGS. 2 and 3. It will be understood that the canister 34 may contain any suitable adsorbent such as, for example, granulated charcoal material.

The canister 34 also has connected thereto a fitting 36 which has vapor outlet passage 38 formed therein and which extends outwardly through the side 30 of the tank to the exterior of the tank. With reference to FIG. 1, passage 38 communicates through a conduit 33 shown in dashed outline to the air inlet 40 of the vehicle engine.

Referring to FIGS. 2 and 3, a liquid/vapor discriminator 42, such as a float operated vent valve, is disposed within the tank and preferably adjacent the inside surface of the upper wall 18 of the tank. Note that the discriminator 42 can be any mechanism that can discriminate between liquid fuel and fuel vapor to prevent liquid fuel from entering a vapor outlet passage 44 and still allow vapor to vent through the passage 44. In one embodiment, the discriminator 42 is a float valve. The discriminator 42 may also act as a rollover valve, if desired. The discriminator 42 has the vapor outlet passage 44 thereof communicating with the interior of the canister 34 as shown in FIG. 2. It will be understood that the discriminator 42 may either be attached to the side of the canister or the undersurface of the upper wall 18 of the tank.

Referring to FIGS. 2 and 3, the filler tube 20 is disposed through the tank wall with the lower end of tube 20 located or positioned at a desired level of liquid fuel fill such that, upon the liquid level reaching the lower end of the tube, the vapor dome above the liquid fuel is isolated from the filler tube and vapor can no longer escape through the filler tube. Accordingly, if the rate of fill is sufficient such that the vapor cannot escape rapidly enough through the discriminator 42, the liquid fuel rises quickly in the filler tube alerting the operator that the tank is at the desired level of fill. This arrangement thus maintains a vapor dome in the fuel level above the tank and prevents slugging of liquid fuel into the discriminator 42 and the canister. In other words, this arrangement acts as protection against overfilling.

The surface of the liquid fuel at the level of the lower end of the filler tube 20 is denoted by the reference character L in FIG. 3. It will be understood that the region of the tank bordered by the wall structure thereof above the level L comprises a vapor dome as denoted by reference numeral 46.

In the present practice of the invention, the filler tube 20 is shown as disposed through the upper wall 18 of the tank; however, it will be understood that the filler tube may be also located through the sidewall 30 if desired.

The present invention thus provides an integrated fuel vapor storage and vapor flow control system for a fuel tank of the type employed for small engines whereupon the tank may be located in close proximity to the engine or in certain applications mounted directly to the engine for modular assembly to the equipment in which the engine is employed. The present invention thus enables implementation of fuel evaporative control on a small engine with only a change in the fuel tank and does not require the addition of other related components to the engine assembly.

Although the invention has hereinabove been described with respect to the illustrated embodiments, it will be understood that the invention is capable of modification and variation and is limited only by the following claims.

What is claimed is:

1. A fuel tank assembly for small engines comprising:
   (a) a tank wall structure having filler tube for refueling including a closure therefor and a fuel feed outlet and an upper region of the tank wall structure defining a vapor dome above the fuel level, the filler tube being disposed through the tank wall and having a lower end positioned at a desired level of fill to define the vapor dome and provide a visual alert to an operator when the fuel level reaches the desired level of fill;
   (b) a vapor storage device disposed within the tank in the vapor dome and having a vapor inlet, an atmospheric air inlet communicating exteriorly through the tank wall structure and a vapor purge outlet communicating exteriorly through the tank wall structure; and,
   (c) a liquid/vapor discriminator disposed within the tank and having an inlet communicating with the vapor dome and an outlet communicating with the storage device vapor inlet.

2. The assembly defined in claim 1, wherein the liquid/vapor discriminator is disposed adjacent the upper portion of the tank wall structure.

3. The assembly defined in claim 1, wherein the storage device is disposed adjacent the upper portion of the tank wall structure.

4. The assembly defined in claim 1, wherein the fuel feed outlet is disposed in the lower region of the fuel tank wall structure for gravity feed.

5. The assembly defined in claim 1, wherein the liquid/vapor discriminator is a valve that includes a float operator.

6. A method of making a fuel tank assembly for small engines comprising:
   (a) forming a fuel tank wall structure having a filler tube with a closure, a fuel vapor dome region and a fuel feed outlet, the filler tube being disposed through the tank wall and having a lower end positioned at a desired level of fill to define the vapor dome and provide a visual alert to an operator when the fuel level reaches the desired level of fill;
   (b) disposing a fuel vapor storage canister within the tank in the region of the vapor dome and venting the canister through the tank wall structure to the atmosphere and connecting a canister purge outlet through the tank wall structure; and,
   (c) disposing a liquid/vapor discriminator in the vapor dome region and connecting the outlet of the valve to the canister.

7. The method defined in claim 6, wherein the step of disposing a liquid vapor discriminator includes disposing a float operated valve.

8. The method defined in claim 6, wherein the step of disposing a storage canister includes disposing a canister adjacent the upper region of the tank wall structure.

9. The method defined in claim 6, wherein the step of disposing a liquid/vapor discriminator includes disposing a valve adjacent the upper region of the tank wall structure.

10. The method defined in claim 6, wherein the step of forming a fuel tank wall structure includes towing a fuel outlet in the bottom of the tank wall structure for gravity feed.

11. The method defined in claim 6, wherein the step of venting the canister includes connecting a conduit for communicating through the sidewall of the tank structure.

12. The method defined in claim 6, wherein the step of connecting a canister purge outlet includes connecting a conduit for communicating through the side of the tank wall structure.

* * * * *